interface US010852731B1

(12) United States Patent
Braley et al.

(10) Patent No.: US 10,852,731 B1
(45) Date of Patent: Dec. 1, 2020

(54) METHOD AND SYSTEM FOR CALIBRATING A PLURALITY OF DETECTION SYSTEMS IN A VEHICLE

(71) Applicant: Waymo LLC, Mountain View, CA (US)

(72) Inventors: Colin Braley, Mountain View, CA (US); Craig Lewin Robinson, Palo Alto, CA (US); Ionut Iordache, Pleasanton, CA (US)

(73) Assignee: WAYMO LLC, Mountain View, CA (US)

( * ) Notice: Subject to any disclaimer, the term of this patent is extended or adjusted under 35 U.S.C. 154(b) by 228 days.

(21) Appl. No.: 15/971,704

(22) Filed: May 4, 2018

Related U.S. Application Data

(60) Provisional application No. 62/611,209, filed on Dec. 28, 2017.

(51) Int. Cl.
*G05D 1/00* (2006.01)
*G07C 5/08* (2006.01)
*G01S 7/40* (2006.01)
*G01S 7/497* (2006.01)

(52) U.S. Cl.
CPC .............. *G05D 1/0088* (2013.01); *G01S 7/40* (2013.01); *G01S 7/497* (2013.01); *G07C 5/0808* (2013.01)

(58) Field of Classification Search
CPC ......... G05D 1/0088; G01S 7/497; G01S 7/40; G07C 5/0808
See application file for complete search history.

(56) References Cited

U.S. PATENT DOCUMENTS

| | | | |
|---|---|---|---|
| 6,596,996 B1 | 7/2003 | Stone et al. | |
| 10,084,967 B1* | 9/2018 | Somasundaram ... | H04N 5/2356 |
| 10,176,596 B1* | 1/2019 | Mou ........................ | G06T 7/80 |
| 2008/0031514 A1* | 2/2008 | Kakinami ................ | G06T 7/80 |
| | | | 382/154 |

(Continued)

OTHER PUBLICATIONS

Sanna Kaasalainen et al., Radiometric Calibration of Terrestrial Laser Scanners with External Reference Targets, Remote Sensing, 2009, pp. 144-158.

(Continued)

*Primary Examiner* — Mussa A Shaawat
(74) *Attorney, Agent, or Firm* — Botos Churchill IP Law LLP

(57) ABSTRACT

Aspects of the disclosure provide for a method of calibrating a vehicle's plurality of detection systems. To calibrate a first detection system, orientation data is collected using the first detection device when the vehicle faces a first direction and a second direction opposite the first direction. To calibrate a second detection system, data is collected using the second detection device while the vehicle moves in a repeatable pattern near a first object. To calibrate a third detection system, light reflected off a second object is detected using the third detection system as the vehicle is moved towards the second object. To calibrate a fourth detection system, data collected using the second detection system and the fourth detection system is compared. To calibrate a fifth detection system, radar signals reflected off a third object is received using the fifth detection system while the vehicle moves relative to the third object.

20 Claims, 13 Drawing Sheets

(56) References Cited

U.S. PATENT DOCUMENTS

| | | | | |
|---|---|---|---|---|
| 2009/0228204 | A1* | 9/2009 | Zavoli | G01S 19/49 |
| | | | | 701/532 |
| 2010/0235129 | A1* | 9/2010 | Sharma | G01S 17/931 |
| | | | | 702/97 |
| 2010/0299063 | A1* | 11/2010 | Nakamura | G06K 9/00798 |
| | | | | 701/532 |
| 2014/0285676 | A1* | 9/2014 | Barreto | H04N 17/002 |
| | | | | 348/187 |
| 2015/0039157 | A1* | 2/2015 | Wolfe | G06F 17/00 |
| | | | | 701/2 |
| 2015/0149088 | A1* | 5/2015 | Attard | G01C 21/36 |
| | | | | 701/538 |
| 2017/0124781 | A1* | 5/2017 | Douillard | G05D 1/0268 |
| 2017/0280135 | A1* | 9/2017 | Shroff | G06T 7/80 |
| 2017/0307876 | A1* | 10/2017 | Dussan | G02B 26/101 |
| 2018/0188361 | A1* | 7/2018 | Berger | G01S 7/497 |
| 2018/0189601 | A1* | 7/2018 | Dabeer | G01C 21/30 |
| 2018/0307245 | A1* | 10/2018 | Khawaja | G05D 1/0276 |
| 2018/0313940 | A1* | 11/2018 | Wu | G01S 17/89 |
| 2019/0049242 | A1* | 2/2019 | Adams | G01C 21/3602 |
| 2019/0049566 | A1* | 2/2019 | Adams | G01S 17/87 |
| 2019/0120947 | A1* | 4/2019 | Wheeler | G01S 17/42 |
| 2019/0258251 | A1* | 8/2019 | Ditty | G05D 1/0088 |
| 2020/0191943 | A1* | 6/2020 | Wu | G01S 13/003 |

OTHER PUBLICATIONS

Mirko Mählisch et al., Sensorfusion Using Spatio-Temporal Aligned Video and Lidar for Improved Vehicle Detection, Intelligent Vehicles Symposium 2006, Jun. 13-15, 2006, Tokyo, Japan, 6 pages.

* cited by examiner

800C

METHOD AND SYSTEM FOR CALIBRATING A PLURALITY OF DETECTION SYSTEMS IN A VEHICLE

CROSS-REFERENCE TO RELATED APPLICATIONS

The present application claims the benefit of the filing date of U.S. Provisional Patent Application No. 62/611,209 filed Dec. 28, 2017, the disclosure of which is hereby incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous tasks while the autonomous vehicle is in motion, which ultimately leads to decisions, such as speeding up, slowing down, stopping, turning, etc. The perception system may include a plurality of detection systems, such as cameras, sensors, and global positioning devices, which gathers and interprets images and sensor data about its surrounding environment, e.g., parked cars, trees, buildings, etc.

BRIEF SUMMARY

Aspects of the disclosure provide for a method of calibrating a plurality of detection systems of a vehicle. The method includes moving the vehicle relative to a first object in a repeatable pattern, and using one or more computing devices to collect a plurality of data points using a first detection system of the plurality of detection systems as the vehicle is moved in the repeatable pattern. The plurality of data points corresponds to the first object. The method also includes using the one or more computing devices to combine locations of the plurality of data points to determine an actual location of the first object, determine a first correction for the first detection system by comparing the locations of the plurality of data points to the actual location, and operate the first detection system using the first correction.

In one example implementation, the repeatable pattern is a figure eight. In another example, combining the locations of the plurality of data points includes averaging the locations of the plurality of data points.

The method optionally also includes moving the vehicle towards a second object at a speed less than a maximum speed. The vehicle is moved between a start distance from the second object and an end distance from the second object. This method also includes using a second detection system of the plurality of detection systems to detect light being reflected off a portion of the second object as the vehicle is moved towards the second object, then using the one or more computing devices to determine intensity values of the detected light for each distance between the start distance and the end distance. This method further includes using the one or more computing devices to determine a second correction for the second detection system based on the intensity values determined for each distance between the start distance and the end distance and operate the second detection system using the second correction. In this example, the second correction includes gain adjustments for the distances between the start distance and the end distance.

In another example implementation, the method optionally also includes positioning the vehicle in a first position facing a first direction and using the one or more computing devices to collect first data from a third detection system of the plurality of detection systems when the vehicle is in the first position. This method further includes positioning the vehicle in a second position facing a second direction directly opposite the first direction and using the one or more computing devices to collect second data from the third detection system when the vehicle is in the second position. In addition, this method includes using the one or more computing devices to determine a third correction for the third detection system by comparing the first data and the second data and operate the third detection system using the third correction. In this example, the first data and the second data include orientation information of the vehicle.

The method also optionally includes positioning the vehicle within a rectangle. A corner object is positioned at each corner of the rectangle, where the corner object is at least mostly vertical with respect to a ground. This method further includes using the one or more computing devices to collect third data using a fourth detection system of the plurality of detection systems, where the third data corresponds to each corner object. In addition, this method includes using the one or more computing devices and the first correction to collect fourth data from the first detection system, where the fourth data corresponds to each corner object, determine a fourth correction for the fourth detection system by comparing the third data and the fourth data, and operate the fourth detection system using the fourth correction.

Optionally, the method also includes moving the vehicle relative to a metal object at a constant speed. This method further includes the one or more computing devices to transmit radar signals using a fifth detection system of the plurality of detection systems and receive reflection signals using the fifth detection system. The reflection signals are the radar signals that are reflected off the metal object. In addition, this method includes using the one or more computing devices to determine the metal object is stationary at a given location based on the received reflection signals, determine a fifth correction for the fifth detection system using the given location of the metal object, and operate the fifth detection system using the fifth correction.

The method additionally or alternatively includes operating the vehicle autonomously based on data collected using the plurality of detection systems.

Other aspects of the disclosure provide for a system. The system includes a plurality of detection systems of a vehicle and one or more computing devices. The plurality of detection systems includes a first detection system configured to collect data points of the vehicle's environment. The one or more computing devices is configured to collect a plurality of data points using the first detection system as the vehicle is moved in a repeatable pattern, where the plurality of data points corresponds to a first object in the vehicle's environment. The one or more computing devices are also configured to combine locations of the plurality of data points to determine an actual location of the first object, determine a first correction for the first detection system by comparing the locations of the plurality of data points to the actual location, and operate the first detection system using the first correction.

The plurality of detection systems optionally also includes a second detection system configured to transmit and detect light being reflected off a given object in the vehicle's environment. In this example, the one or more computing devices are additionally configured to detect, using the second detection system, light being reflected off a portion of a second object as the vehicle is moved towards the second object between a start distance and an end distance and determine intensity values of the detected light for each distance between the start distance and the end distance. The one or more computing devices in this example are also configured to determine a second correction for the second detection system based on the intensity values determined for each distance between the start distance and the end distance and operate the second detection system using the second correction.

The plurality of detection systems also optionally includes a third detection system configured to collect orientation information of the vehicle. In this example, the one or more computing devices are additionally configured to collect first data from the third detection system when the vehicle is in a first position facing a first direction and collect second data from the third detection system when the vehicle is in a second position facing a second direction. The second direction is directly opposite the first direction. The one or more computing devices in this example are also configured to determine a third correction for the third detection system by comparing the first data and the second data and operate the third detection system using the third correction.

Optionally, the plurality of detection systems also includes a fourth detection system. In this example, the one or more computing devices are additionally configured to collect third data using the fourth detection system, where the third data corresponds to one or more corner objects when the vehicle is positioned within a rectangle. The one or more corner objects are positioned at each corner of the rectangle and are at least mostly vertical with respect to a ground. The one or more computing devices in this example are also configured to collect fourth data using the first detection system and the first correction. The fourth data corresponds to each corner object. In addition, the one or more computing devices in this example are configured to determine a fourth correction for the fourth detection system by comparing the third data and the fourth data and operate the fourth detection system using the fourth correction.

The plurality of detection systems also optionally includes a fifth detection system configured to transmit radar signals. In this example, the one or more computing devices are additionally configured to receive reflection signals using the fifth detection system. The reflection signals are the radar signals that are reflected off a metal object when the vehicle is moved relative to the metal object at a constant speed. The one or more computing devices are also configured to determine the metal object is stationary at a given location based on the received reflection signals, determine a fifth correction for the fifth detection system using the given location of the metal object, and operate the fifth detection system using the fifth correction.

The system additionally or alternatively also includes the vehicle.

Further aspects of the disclosure provides for a non-transitory, tangible computer-readable storage medium on which computer readable instructions of a program are stored. The instructions, when executed by one or more computing devices, cause the one or more computing devices to perform a method. The method includes collecting a plurality of data points using a first detection system of a vehicle as the vehicle is moved in a repeatable pattern. The plurality of data points corresponds to a first object in the vehicle's environment. This method also includes averaging locations of the plurality of data points to determine an actual location of the first object, determining a first correction for the first detection system by comparing the locations of the plurality of data points to the actual location, and operating the first detection system using the first correction.

The method optionally also includes using a second detection system of the vehicle to detect light being reflected off a portion of a second object as the vehicle is moved towards the second object between a start distance and an end distance and determining intensity values of the detected light for each distance between the start distance and the end distance. This method additionally includes determining a second correction for the second detection system based on the intensity values determined for each distance between the start distance and the end distance and operating the second detection system using the second correction.

Optionally, the method also includes collecting first orientation data using a third detection system of the vehicle when the vehicle is in a first position facing a first direction and collecting second orientation data using the third detection system when the vehicle is in a second position facing a second direction. The second direction is directly opposite the first direction. This method additionally includes determining a third correction for the third detection system by comparing the first orientation data and the second orientation data and operating the third detection system using the third correction.

The method also optionally includes collecting third data using a fourth detection system of the vehicle, where the third data corresponds to one or more corner objects when the vehicle is positioned within a rectangle. The one or more corner objects are positioned at each corner of the rectangle and are at least mostly vertical with respect to a ground. This method additionally includes collecting fourth data using the first detection system and the first correction, where the fourth data corresponding to each corner object, determining a fourth correction for the fourth detection system by comparing the third data and the fourth data, and operating the fourth detection system using the fourth correction.

DETAILED DESCRIPTION

Overview

The technology relates to calibrating a plurality of detection systems in a vehicle. The plurality of detection systems may form an object detection system configured to provide sensor data to the vehicle's computing devices. This sensor data may describe the shape and geographic location coordinates of objects detected in the vehicle's environment. Other sensor data collected by the plurality of detection systems may include, for example, reflectivity, speed, trajectory data, etc.

The plurality of detection systems in the vehicle may include up to or at least five detection systems: a first detection system, a second detection system, a third detection system, a fourth detection system, and a fifth detection system. Each detection system may be configured to detect objects in the vehicle's environment using different types of sensors, independently or in combination.

The plurality of detection systems may be calibrated in turn such that the coordinate frames of each detection system are calibrated to match that of the vehicle and of every other detection system on the vehicle. The calibration may be performed prior to the vehicle's hours of operation for a given day, or "shift," periodically, or as needed to address calibration issues or desired sensor accuracy. After the calibration, locations of detected objects may be more accurately determined with respect to the vehicle. The plurality of detection systems may be calibrated in a particular order, as described below. In some cases, the order of calibration may be different.

The features described herein may allow autonomous or semi-autonomous vehicles to be properly calibrated for operation in fast and efficient ways. Quicker calibration means vehicles may be sent to pick-up passengers and/or cargo in a more timely fashion, even as demand fluctuates. In addition, fewer resources, such as fuel, time, and manpower, are required in the preparation of an autonomous vehicle for service, which may reduce overall costs of transportation services using such autonomous vehicles.

Example Systems

Figure 1:
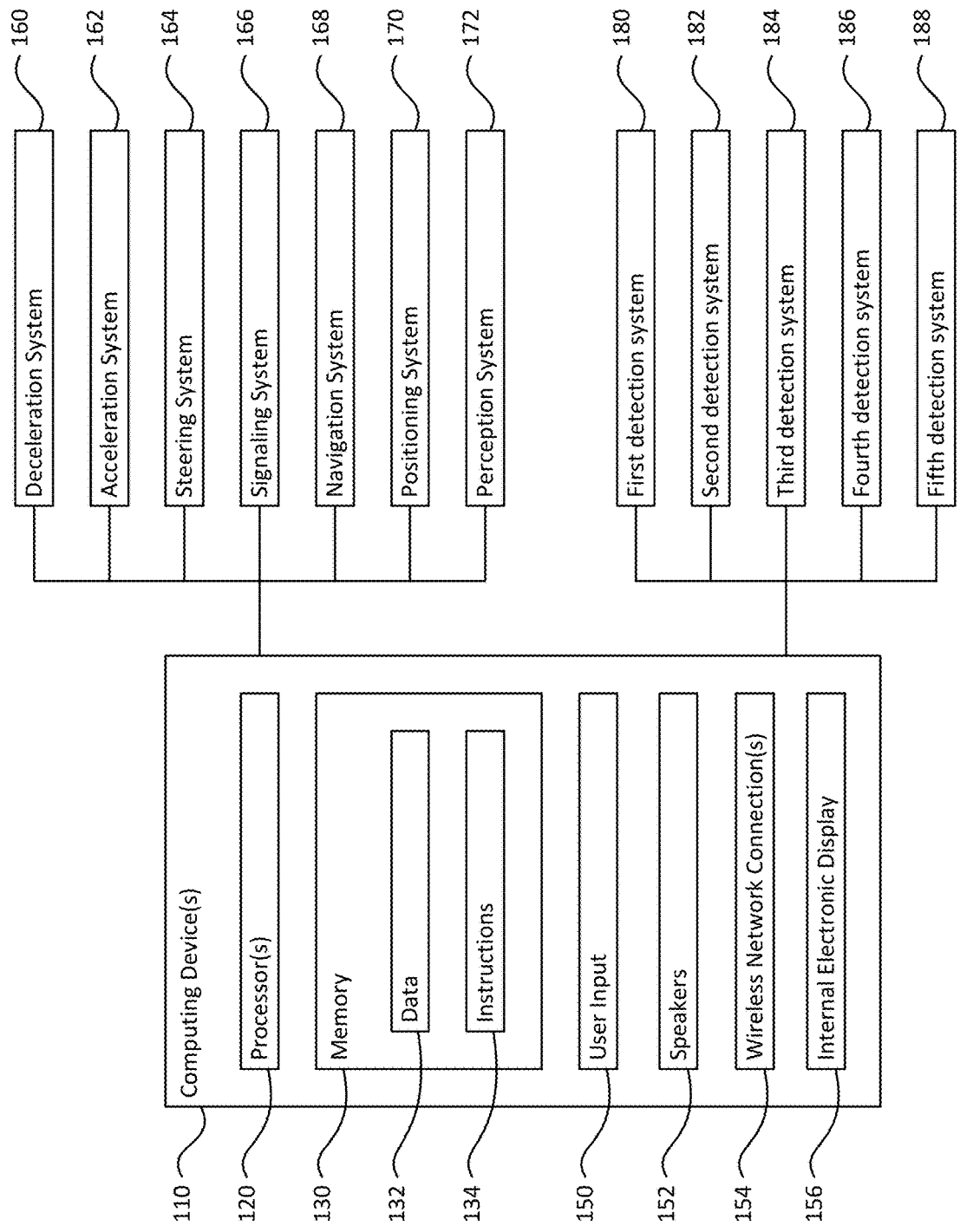
FIG. 1 is a functional diagram of a vehicle 100 in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle 100 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle 100 may have one or more computing devices 110 that include one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of the vehicle's computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the vehicle's computing devices 110. Accordingly, references to a processor or computing device will be understood to include references to a collection of processors or computing devices or memories that may or may not operate in parallel.

The vehicle's computing devices 110 may have all of the components normally used in connection with a computing device such as the processor and memory described above, as well as a user input 150 (e.g., a mouse, keyboard, touch screen and/or microphone), various electronic displays (e.g., a monitor having a screen, a small LCD touch-screen or any other electrical device that is operable to display information), audio output (such as speakers 152), and a wireless network connection 154. In this example, the vehicle 100 includes an internal electronic display 156. In this regard, internal electronic display 156 may be located within a cabin of vehicle 100 and may be used by the vehicle's computing devices 110 to provide information to passengers within the vehicle 100.

In one example, the vehicle's computing devices 110 may be an autonomous driving computing system incorporated into vehicle 100. The autonomous driving computing system may capable of communicating with various components of the vehicle 100 as needed in order to control the vehicle 100 in fully autonomous (without input from a driver) as well as semi-autonomous (some input from a driver) driving modes.

When engaged, the vehicle's computing devices 110 may control some or all of these functions of vehicle 100 and thus be fully or partially autonomous. It will be understood that although various systems and the vehicle's computing devices 110 are shown within vehicle 100, these elements may be external to vehicle 100 or physically separated by large distances. In this regard, the vehicle's computing devices 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to the vehicle's computing devices 110, in actuality, these systems may also be incorporated into the vehicle's computing devices 110, again as an autonomous driving computing system for controlling vehicle 100.

As an example, the vehicle's computing devices 110 may interact with deceleration system 160 and acceleration system 162 in order to control the speed of the vehicle 100. Similarly, steering system 164 may be used by the vehicle's computing devices 110 in order to control the direction of vehicle 100. For example, if vehicle 100 configured for use on a road, such as a car or truck, the steering system may include components to control the angle of wheels to turn the vehicle 100. Signaling system 166 may be used by the vehicle's computing devices 110 in order to signal the vehicle's intent to other drivers or vehicles, for example, by lighting turn signals or brake lights when needed.

Navigation system 168 may be used by the vehicle's computing devices 110 in order to determine and follow a route to a location. In this regard, the navigation system 168 and/or data 132 may store map information, e.g., highly detailed maps identifying the shape and elevation of roads, lane lines, intersections, crosswalks, speed limits, traffic signals, buildings, signs, real time traffic information, vegetation, or other such objects and information. Map information may also include information that describes the location of speed limit signs as well as speed limits for sections of road or zones.

Positioning system 170 may be used by the vehicle's computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle 100. The location of the vehicle may include an absolute geographical location, such as latitude, longitude, and altitude as well as relative location information, such as a location relative to other cars immediately around it which can often be determined with less noise that absolute geographical location.

The positioning system 170 may also include other devices in communication with the vehicle's computing devices 110, such as an accelerometer, gyroscope or another direction/speed detection device to determine the direction and speed of the vehicle 100 or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the vehicle's computing devices 110, other computing devices and combinations of the foregoing.

The perception system 172 may include one or more components for detecting and performing analysis on objects external to the vehicle 100 such as other vehicles, obstacles in the road, traffic signals, signs, trees, etc. For example, the perception system 172 may include a plurality of detection systems, such as, for example, lasers, sonar units, radar units, cameras, or any other detection devices which record data which may be processed by the vehicle's computing devices 110. This data may describe the shape and geographic location coordinates of objects detected in the vehicle's environment.

Figure 2:
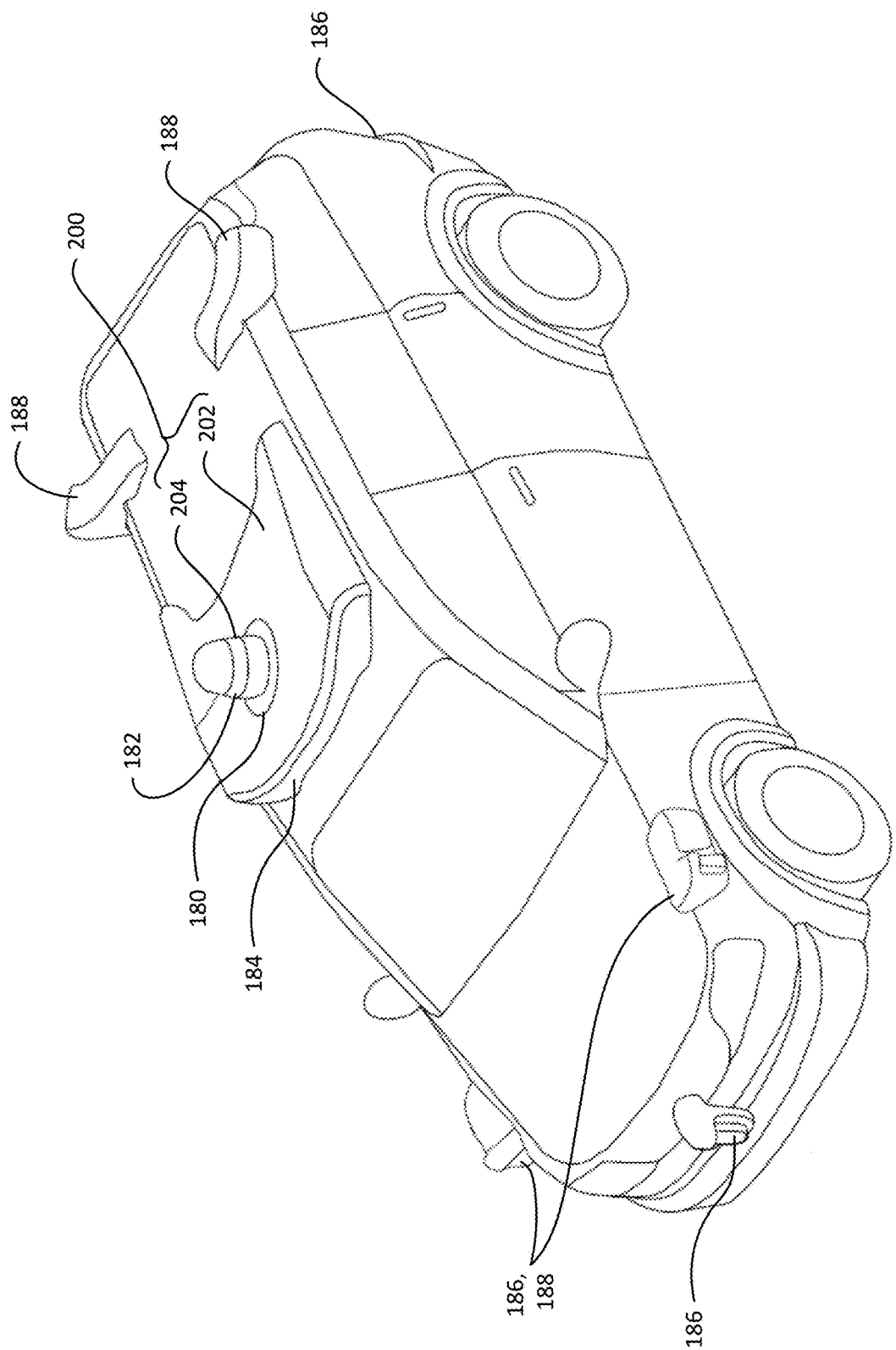
FIG. 2 is a pictorial diagram of a vehicle 100 in accordance with aspects of the disclosure.

The plurality of detection systems in the vehicle 100 may include a first detection system 180, a second detection system 182, a third detection system 184, a fourth detection system 186, and a fifth detection system 188. Each detection system may be positioned on or in different portions of the vehicle 100 and may be configured to detect objects in the vehicle's environment using different types of sensors. As shown in FIG. 2, the vehicle 100 may include a positioning box 200 mounted atop a roof of the vehicle 100 or in a different part of the vehicle 100. When mounted atop the roof of the vehicle 100, the positioning box 200 may include a dome that comprises a lower dome portion 202 and an upper dome portion 204 that are both configured to house one or more of the detection systems. For instance, the first detection system 180 and the third detection system 184 may be located at least partially within the lower dome portion 202 atop the roof of the vehicle 100. The second detection system 182 may be mounted at least partially within the upper dome portion 204 atop the lower dome portion. The fourth detection system 186 may include one or more sensors mounted on side mirrors, front bumper, rear bumper, or other locations on the vehicle 100 below or lower than the roof of the vehicle 100. The fifth detection system 188 may include one or more sensors mounted at or near one or more corners of the vehicle 100, or for instance at the corners on the roof of vehicle 100 or below. Different arrangements of the detection systems may be utilized in other implementations.

The first detection system 180 may include one or more sensors configured to determine an orientation or pose of a positioning box 200. For example, the first detection system 180 may be an inertial measurement unit. For example, the first detection system 180 may include a gyroscope and an accelerometer that are intrinsically calibrated based on a direction of gravity. The orientation or pose of the positioning box 200 may be determined in relation to Cartesian axes of the vehicle's environment, principle axes of the vehicle, or other type of coordinate system.

The second detection system 182 may include one or more lidar systems configured to detect objects within a wide angle view and within a first range of distances from the vehicle 100. In one example, the second set may comprise 64 lidar systems and may be configured to send an electromagnetic signal out in a ring pattern. The wide angle view in this example is the 360-degree area around the vehicle 100, and the set first range is between about 20 meters and about 80 meters from the vehicle 100.

The third detection system 184 may be one or more lidar systems configured to detect objects within a narrow angle view and within a set second range of distances from the vehicle 100. The narrow angle view is smaller than the wide angle view, and the set second range reaches a farther distance than the set first range. For example, the set second range may be between about 60 meters and at least 125 meters, such as more than 200 meters, from the vehicle 100. The narrow angle view in this example may be within a 60-degree angle. The third detection system 184 may be steerable by rotating up to 360 degrees about an axis.

The fourth detection system 186 may include one or more lidar systems configured to detect objects in areas where the second detection system 182 and the third detection system 184 are less likely to reach, or blind spots. For example, objects below a particular height and within a particular distance from the vehicle 100 may be less likely to be detected by the second detection system 182 or the third detection system 184 that are positioned on top of the vehicle 100. The one or more lidar sensors of the fourth detection system 186 may be positioned lower than the second or third detection systems to better detect objects that may be in the blind spots of the second or third detection systems. In the example in FIG. 2, the one or more lidar sensors may be at a front bumper, a rear bumper, and along each side of the vehicle 100. The one or more lidar systems may additionally be angled towards the ground. The fourth detection system 186 may therefore detect objects within a set third range of distances from the vehicle 100 that reaches a shorter distance than the set first range. For example, the set third range may be between about 0 meters and about 60 meters from the vehicle 100.

The fifth detection system 188 may include one or more radar systems configured to detect objects within a wide angle view. The one or more radar systems may be positioned at each corner of the vehicle 100, as shown in FIG. 2, and the wide angle view may be a 360-degree area from each radar system.

Of course, in some examples, the plurality of detection systems includes additional detection systems that may include cameras, microphones, or other types of sensors. For example, one or more cameras may be mounted atop the vehicle 100, such as in the upper dome portion 204. Microphones or other types of sensors may be mounted atop the vehicle as well, such as in the lower dome portion 202.

Example Methods

The plurality of detection systems 180, 182, 184, 186, 188 may be calibrated in turn such that the coordinate frames of each detection system are calibrated to match that of the vehicle 100 and of every other detection system. The calibration may be performed prior to the vehicle's hours of operation for a given day, or "shift," periodically, or as needed to address calibration errors or issues. After the calibration, locations of detected objects may be more accurately determined with respect the vehicle 100. Each detection system may be calibrated in a particular order, as described below. In some cases, the order of calibration may be different.

Figure 3B:
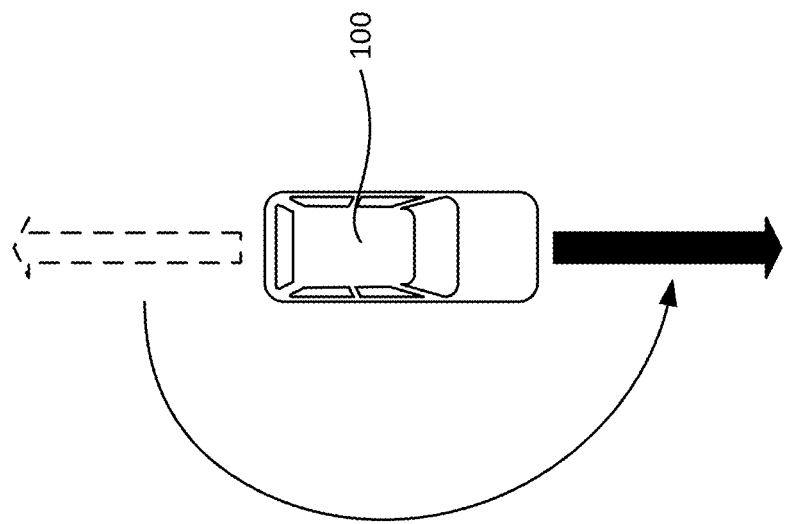
FIGS. 3A and 3B depict a pictorial diagram of a calibration method in accordance with aspects of the disclosure.
Figure 3A:
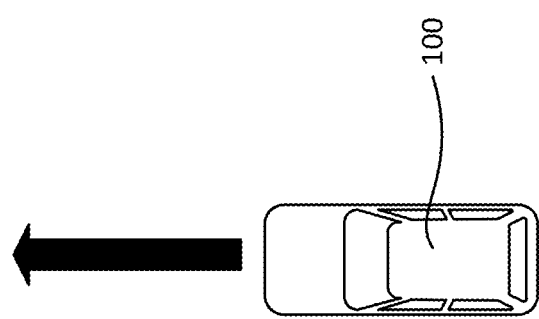

As shown in FIGS. 3A and 3B, the first detection system 180 may be calibrated by parking the vehicle 100 in a first position facing a first direction then parking the vehicle 100 in a second position facing a second direction directly opposite, or 180 degrees from, the first direction. In one example, the vehicle 100 is driven into the first position and parked for a set amount of time, then driven around to the second position and parked for the set amount of time. The first position and the second position are in a same location, with the vehicle 100 facing in different directions. In another example, the vehicle 100 may be rotated 180 degrees on a level surface, such as about a turntable.

When in the first position as shown in FIG. 3A, first data is collected from the first detection system 180, and when in the second position as shown in FIG. 3B, second data is collected from the first detection system 180. The first data and the second data are orientation or pose information. The first data and the second data may be averaged to determine an amount of bias for the first detection system 180. The amount of bias may be an average distance by which a location or direction of the vehicle 100 is skewed from an actual location or direction of the vehicle 100, or the zero error.

A correction to the first detection system 180 may be determined in order to adjust the zero values of the one or more sensors of the first detection system 180. In some examples, the correction may be a 3×3 transform matrix. The correction may be stored in a memory of the vehicle's computing devices 110 and used to operate the first detection system 180. In this way, the vehicle's computing devices 110 may detect locations of objects in the vehicle's environment using the calibrated first detection system 180 with more accuracy in relation to the vehicle 100. The vehicle 100 may be operated autonomously with the more accurately detected locations of objects.

Figure 4:
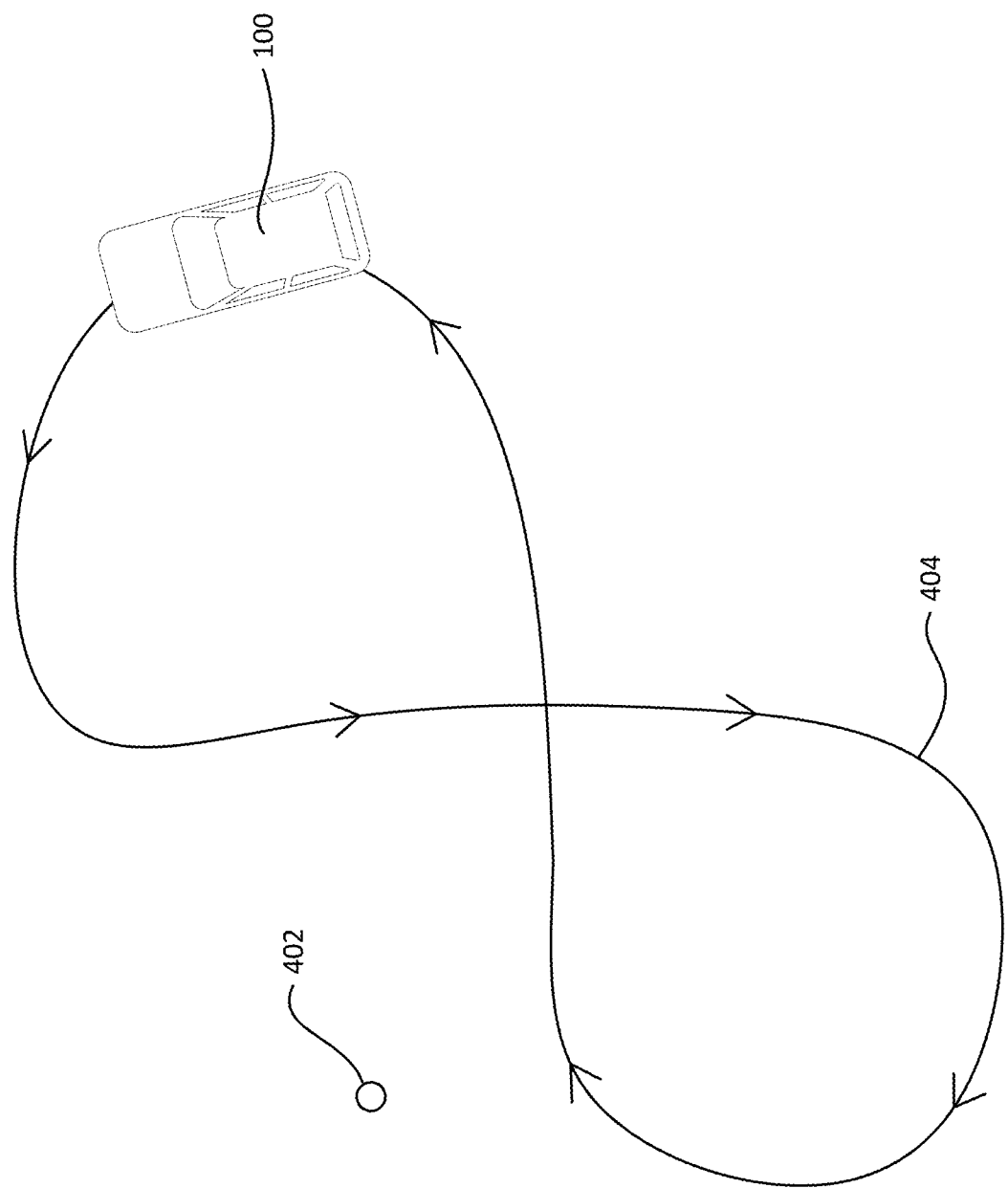
FIG. 4 depicts a pictorial diagram of another calibration method in accordance with aspects of the disclosure.

After calibrating the first detection system 180, the second detection system 182 may be calibrated by moving the vehicle 100 in relation to at least one object as shown in FIG. 4. The at least one object has a three-dimensional (3D) shape and size that is detectable by the second detection system 182. The at least one object may be a stationary object (for instance, once the at least one object is positioned, it remains fixed). As an example, the at least one stationary object may include a pole, such as pole 402, or a signpost. The stationary object may also have a known location. In one example, in order to perform the calibration, the vehicle 100 may be driven in a repeatable pattern, such as a figure eight 404, in the vicinity of the at least one stationary object.

As the vehicle 100 is driven in the pattern, a plurality of data points may be collected by the second detection system 182, and the vehicle's computing devices 110 may plot the data points onto a 3D model. Data points that are part of a moving object may be identified and filtered out by the vehicle's computing devices 110. Data points that are from small movements of a stationary object, such as the pole 402, may also be identified and filtered out. The data points corresponding to the stationary object may be identified and processed to determine an amount of bias. The amount of bias may be determined by averaging the data points of the stationary object to calculate an actual location of the stationary object and subtracting the calculated actual location from the data points of the stationary object. When the actual location of the stationary object is known, the known actual location may be used rather than the calculated actual location. For example, the known actual location may be identified using coordinates such as longitude/latitude, map location, or other coordinate system.

A correction to the second detection system 182 may be determined in order to adjust zero values of the one or more lidar systems of the second detection system 182. In some examples, the correction may be a 3×3 transform matrix. The correction may be stored in the memory of the vehicle's computing devices 110 and used to operate the second detection system 182. In this way, the vehicle's computing devices 110 may detect locations of objects in the vehicle's environment using the calibrated second detection system 182 with more accuracy in relation to the vehicle 100. The vehicle 100 may be operated autonomously with the more accurately detected locations of objects.

In addition or alternatively, the vehicle 100 may remain stationary at location while the at least one object is moved to calibrate the second detection system 182. In this example, a reference detection system, such as another second detection system, may be placed at a known location relative to the location of the vehicle 100. While the at least one object is moved relative to the vehicle 100, the second detection system 182 may collect a first plurality of data points, and the reference detection system may collect a second plurality of data points. The vehicle's computing devices 110 may plot the first and second pluralities of data points onto a 3D model to compare the two pluralities of data points. An amount of bias of the second detection system 182 may be determined based on how the first plurality of data points varies from the second plurality of data points in the 3D model.

A correction to the second detection system 182 may be determined in order to adjust zero values of the one or more lidar systems of the second detection system 182. In some examples, the correction may be a 3×3 transform matrix. The correction may be stored in the memory of the vehicle's computing devices 110 and used to operate the second detection system 182.

Figure 5A:
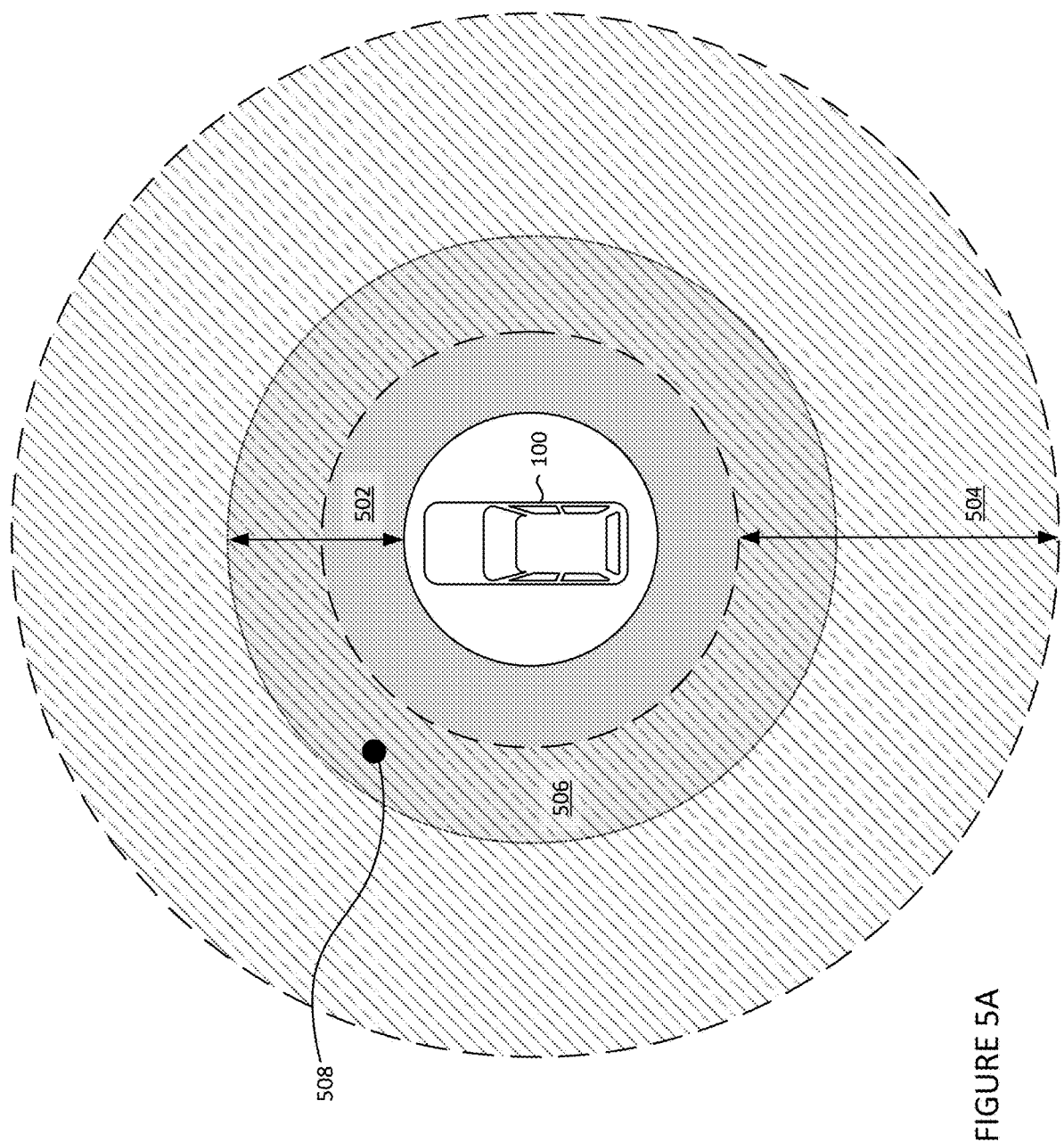
FIGS. 5A-5C depict pictorial diagrams of further calibration methods in accordance with aspects of the disclosure.

After calibrating the second detection system 182, the third detection system 184 may be calibrated by comparing data collected by the third detection system 184 with data collected by the calibrated second detection system 182. The collected data from the third detection system 184 and the second detection system 182 may identify objects in an overlap area of the two detection systems. As shown in FIG. 5A, the second detection system 182 has a set first range 502 between 20 meters and 80 meters from the vehicle 100, and the third detection system 184 has a set second range 504 between 60 meters and 125 meters or more or less from the vehicle. In this example, the overlap area 506 is between 40 and 60 meters from the vehicle 100. When the third detection system 184 is steerable, the collected data from the third detection system 184 includes data from at least the front of the vehicle 100, the right of the vehicle 100, the back of the vehicle 100, and the left of the vehicle 100. In the example shown in FIG. 5A, the collected data includes an object 508 that is within the overlap area 506 and is detectable by both the second detection system 182 and the third detection system 184.

A correction may be determined in order to adjust zero values of the third detection system 184 so that locations of the identified objects detected by the third detection system matches locations of the identified objects detected by the second detection system 182. In some examples, the correction may be a 3×3 transform matrix. The correction may be stored in the memory of the vehicle's computing devices 110 and used to operate the third detection system 184. In this way, the vehicle's computing devices 110 may detect locations of objects in the vehicle's environment using the calibrated third detection system 184 with more accuracy in relation to the vehicle 100. The vehicle 100 may be operated autonomously with the more accurately detected locations of objects.

Figures 5B, 5C:
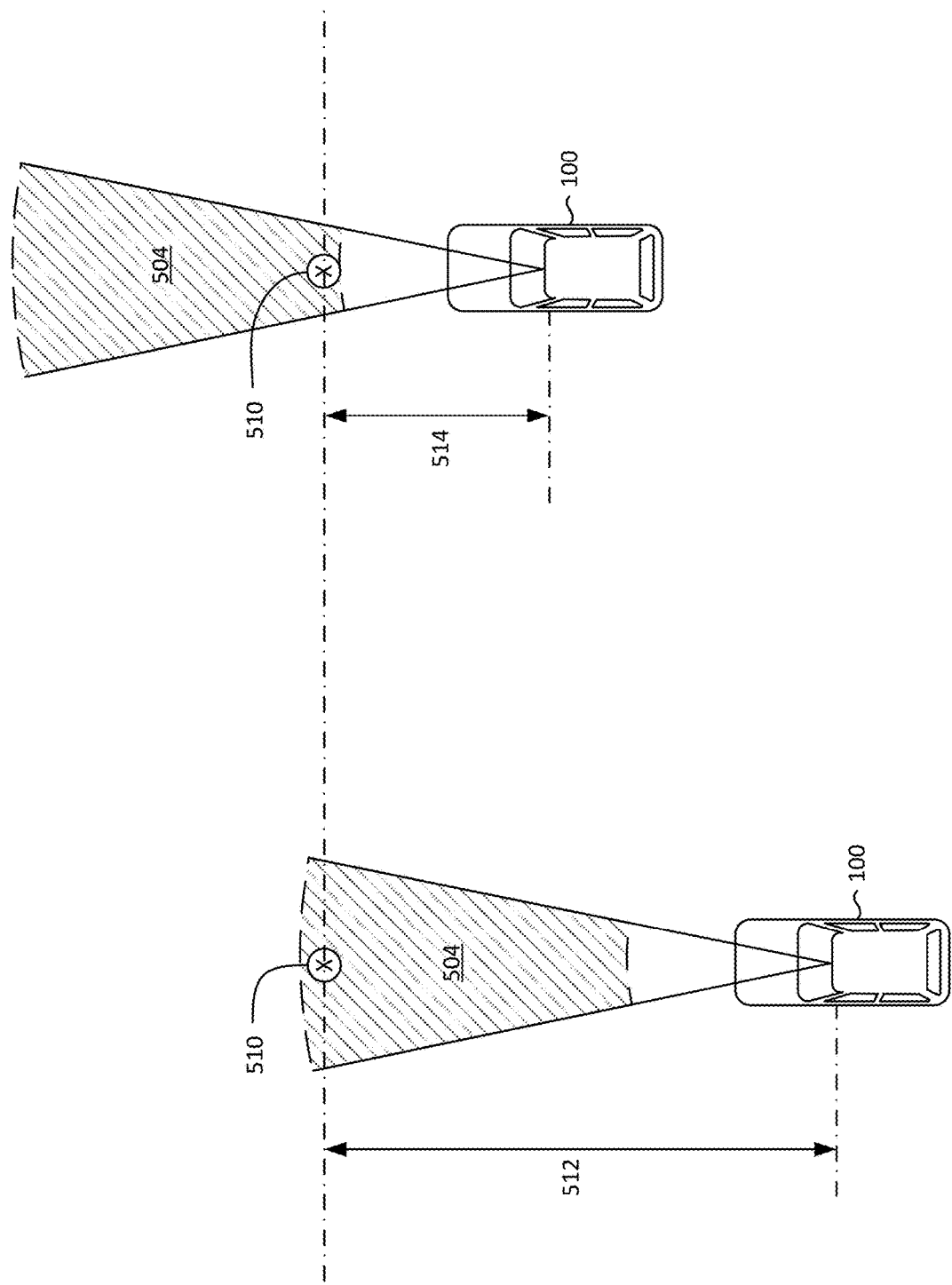

In addition or alternatively, the third detection system 184 may also be calibrated by moving the third detection system 184 towards a target 510 positioned at least a set start distance 512 from the third detection system 184, as depicted in FIG. 5B. The target 510 may include a color and material that provides a particular reflectivity. Then, in one example, the vehicle 100 on which the third detection system 184 is mounted may be driven towards the target 510, starting from the set start distance 512 until the vehicle 100 reaches a set end distance 514, as depicted in FIG. 5C. Driving the vehicle 100 towards the target 510 moves the third detection system 184 towards the target 510. For instance, the set start distance 512 may be at least 122 meters or more or less from the third detection system 184, and the set end distance 514 may be at most 60 meters or more or less from the third detection system 184. The vehicle 100 may be driven slowly, for instance, at less than 5 miles per hour or more or less, towards the target 510.

As the vehicle 100 is driven towards the target, the third detection system 184 may collect intensity values at the third detection system caused by signal reflected off a point or an area within the target. In addition or alternatively, for the intensity calibration, the target may be moved towards the vehicle 100 rather than the vehicle 100 being driven towards the target. The signal may be a light signal that is transmitted from the third detection system 184, such as a laser from lidar, and the reflection signal received at the third detection system 184 may be the light signal that is reflected off a portion of the target. The collected intensity values at each distance may be mapped by the vehicle's computing devices 110. The vehicle's computing devices 110 may determine a correction for the third detection system 184, such as gain adjustments at each distance that normalizes the collected intensity values to a single value. The gain adjustments may be stored in the memory of the vehicle's computing devices 110 and used to operate the third detection system 184. In this way, the vehicle's computing devices 110 may adjust for light decay that occurs in the far field of the third detection system 184.

In an alternative implementation, the intensity calibration of the third detection system 184 may be performed separate from the vehicle 100. In this example, lenses and/or mirrors, such as those typically used in telescopes or other optical assemblies, may be used to increase and decrease the distance light travels between the target and the third detection system 184. The lenses and/or mirrors may include a collimator and an attenuator. In particular, the attenuator may be electrochromic glass, a filter, or a wedge window. The intensity calibration using the collimator and the attenuator may include transmitting a light signal from the third detection system 184 through the collimator towards a target. Then, the intensity calibration may include changing a focus of the collimator over time and using the attenuator to change the power of the transmitted signal in response to the changing focus to simulate the changing the distance between the third detection system 184 and the target. Specifically, the collimator and the attenuator may be configured in this way to simulate the expected $1/r^2$ change in the power of the light signal, where r is the distance between the third detection system 184 and the target, when the light signal is reflected off the target and received back at the third detection system 184. In addition, the lenses and/or mirrors may include a compact (table-top) system that allows the intensity calibration to be done indoors, e.g., on the manufacturing line. The compact system may be used for long-range systems that have so long a range that they would typically be calibrated outdoors, often in an uncontrolled environment that can disrupt production.

Figure 6A:
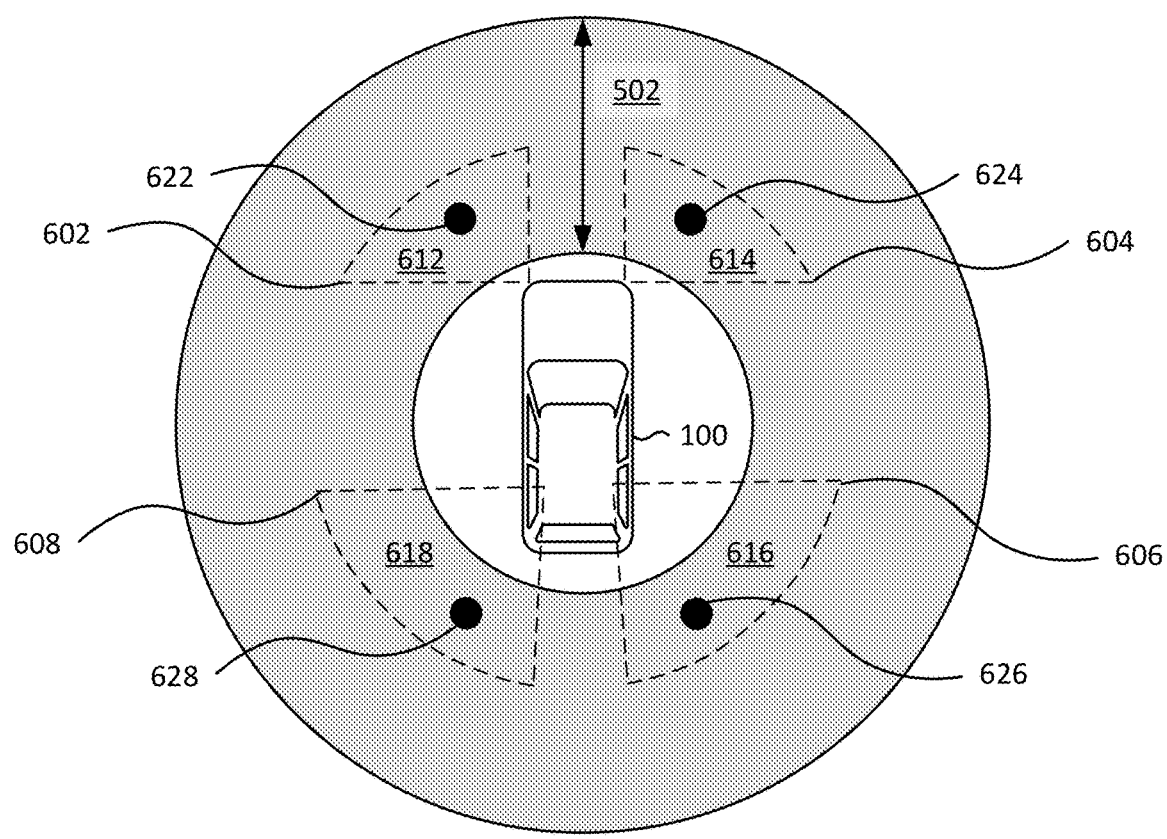
FIGS. 6A-6B depict pictorial diagrams of yet another calibration method in accordance with aspects of the disclosure.

After calibrating the second detection system 182, the fourth detection system 186 may be calibrated by comparing data collected by the fourth detection system 186 with data collected by the calibrated second detection system 182. The collected data from the fourth detection system 186 and the second detection system 182 may identify at least one target in an overlap area of the two detection systems. The overlap area may be at about 40 meters or more or less from the vehicle 100 and at each corner of the vehicle 100. As shown in FIG. 6A, the second detection system 182 has the set first range 502 between 20 meters and 80 meters from the vehicle 100, and the fourth detection system 186 has set third ranges 602, 604, 606, 608 between 0 meters and 60 meters from the vehicle. In this example, the amount of overlap is between 20 and 60 meters in overlap areas 612, 614, 616, 618, and targets 622, 624, 626, 628 may be detectable by both the fourth detection system 186 and the second detection system 182 in each of the overlap areas, respectively.

Figure 6B:
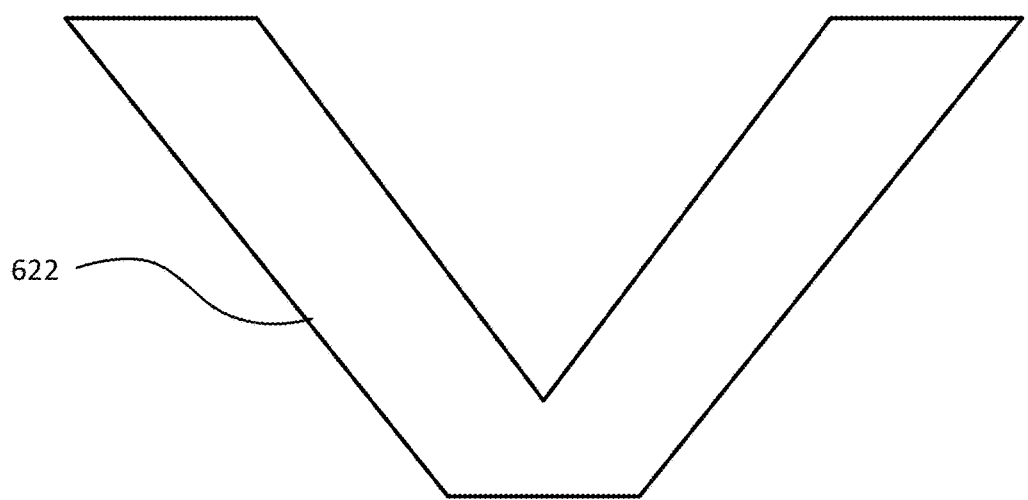

The targets may have a 3D shape and size that are detectable by both the fourth detection system 186 and the second detection system 182. In the example shown in FIG. 6A, the four targets 622, 624, 626, 628 may be positioned in a rectangle in which the vehicle 100 may fit. In this example, the targets 622, 624, 626, 628 are V-shaped, as shown in FIG. 6B, W-shaped objects, or other identifiable shape, and the targets are at least mostly vertical with respect to the ground. The vehicle 100 may be driven into the rectangle and parked for a set amount of time, such as 10 seconds or more or less, during which the fourth detection system 186 and the second detection system 182 collects data. In an alternative example, the vehicle 100 may remain stationary at location in which the at least one target is already in the overlap area or the at least one target is moved into the overlap area.

A correction may be determined in order to adjust zero values of the fourth detection system 186 so that locations of the at least one target detected by the fourth detection system 186 matches locations of the at least one target detected by the second detection system 182. In some implementations, a correction may be determined for each individual lidar system of the fourth detection system 186. In some examples, the correction may be a 3×3 transform matrix. These correction or corrections may be stored in the memory of the vehicle's computing devices 110 and used to operate the fourth detection system 186. In this way, the vehicle's computing devices 110 may detect locations of objects in the vehicle's environment using the calibrated fourth detection system 186 with more accuracy in relation to the vehicle 100. The vehicle 100 may be operated autonomously with the more accurately detected locations of objects.

In addition or alternatively, the fourth detection system 186 may be calibrated by moving the vehicle 100 in a repeatable pattern in relation to one or more targets and determining a correction based on the collected data from the pattern, similar to what is described above for the second detection system 182.

Figure 7:
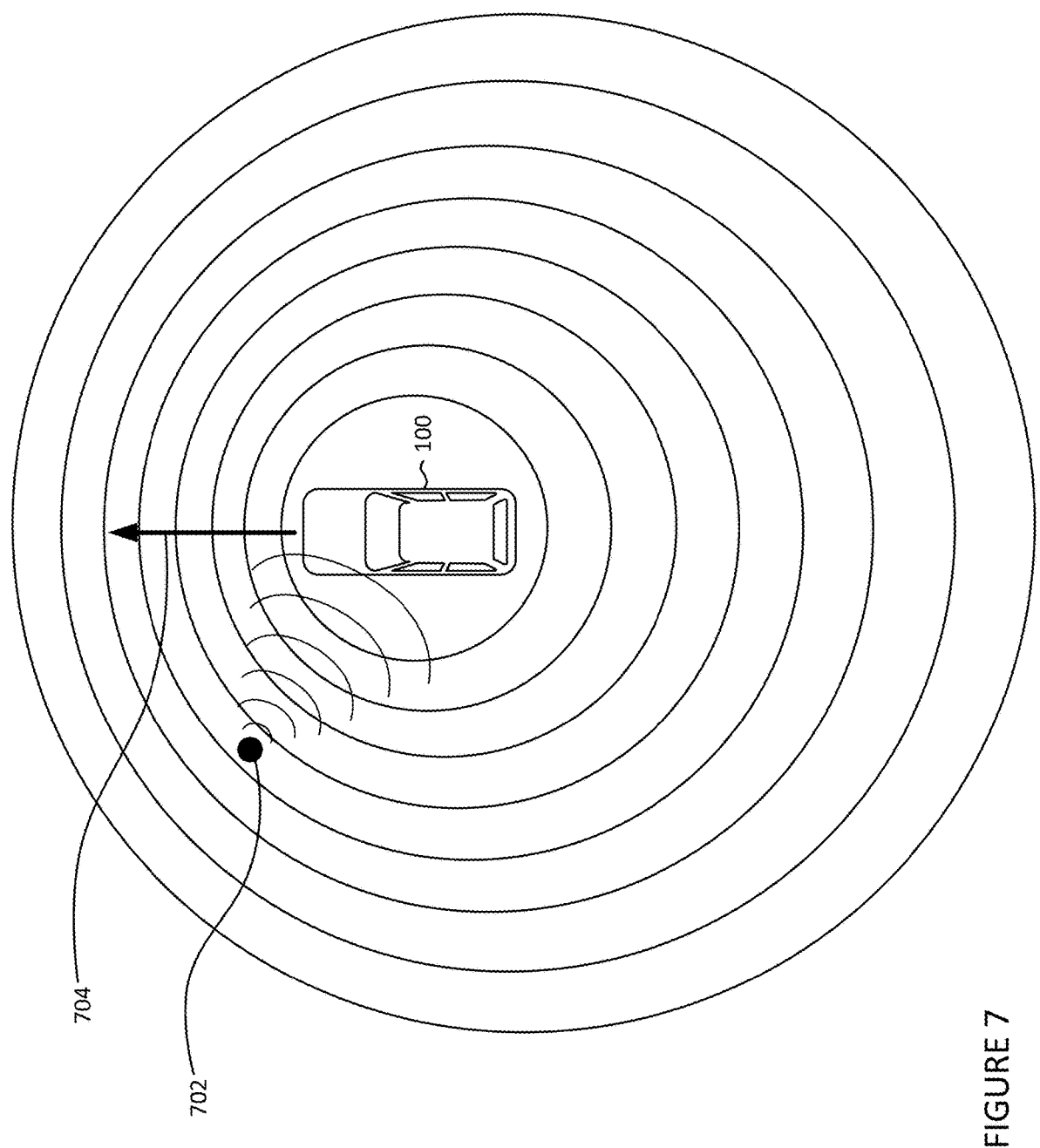
FIG. 7 depicts a pictorial diagram of another calibration method in accordance with aspects of the disclosure.
Figure 8A:
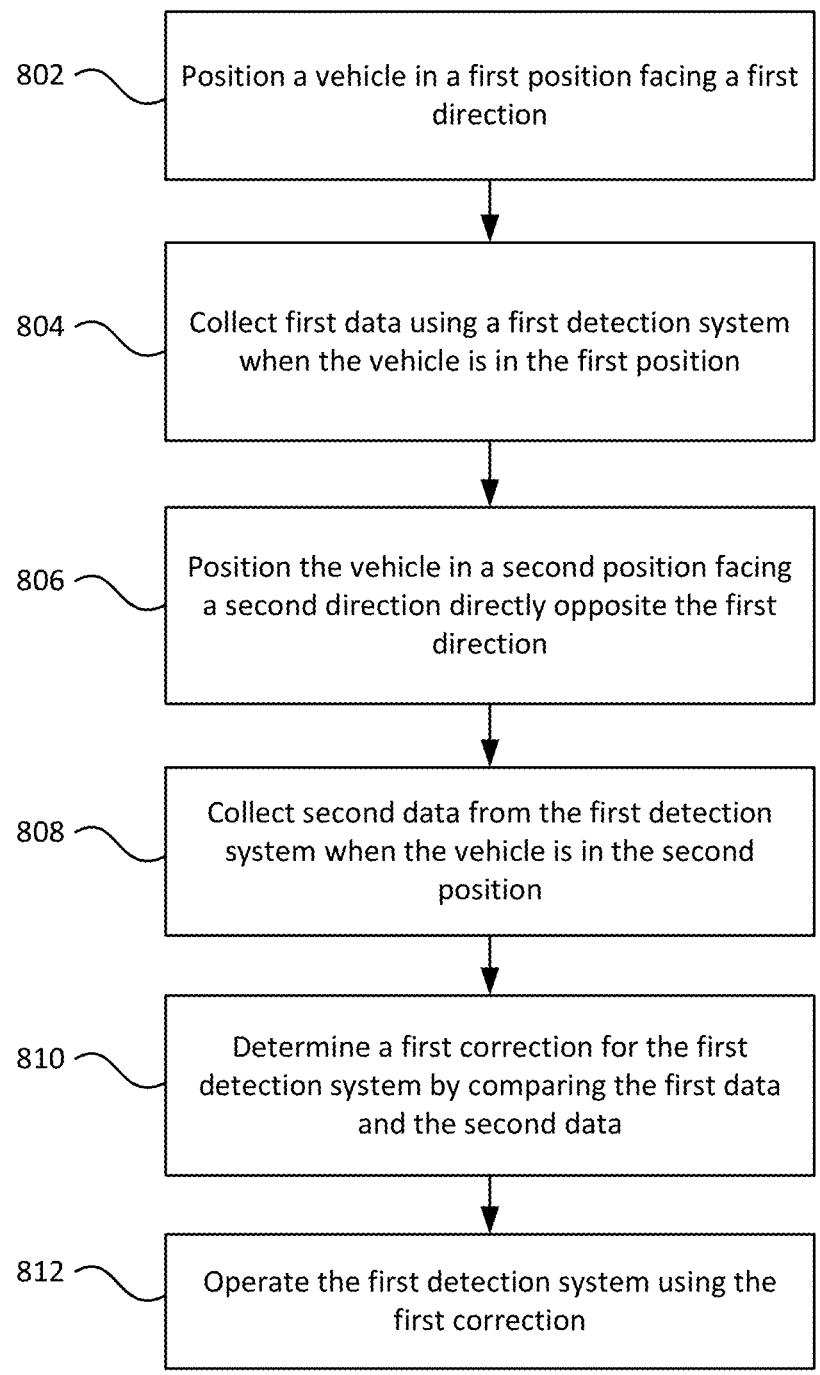
FIGS. 8A-8E are example flow diagrams 800A-800E in accordance with aspects of the disclosure.
Figure 8B:
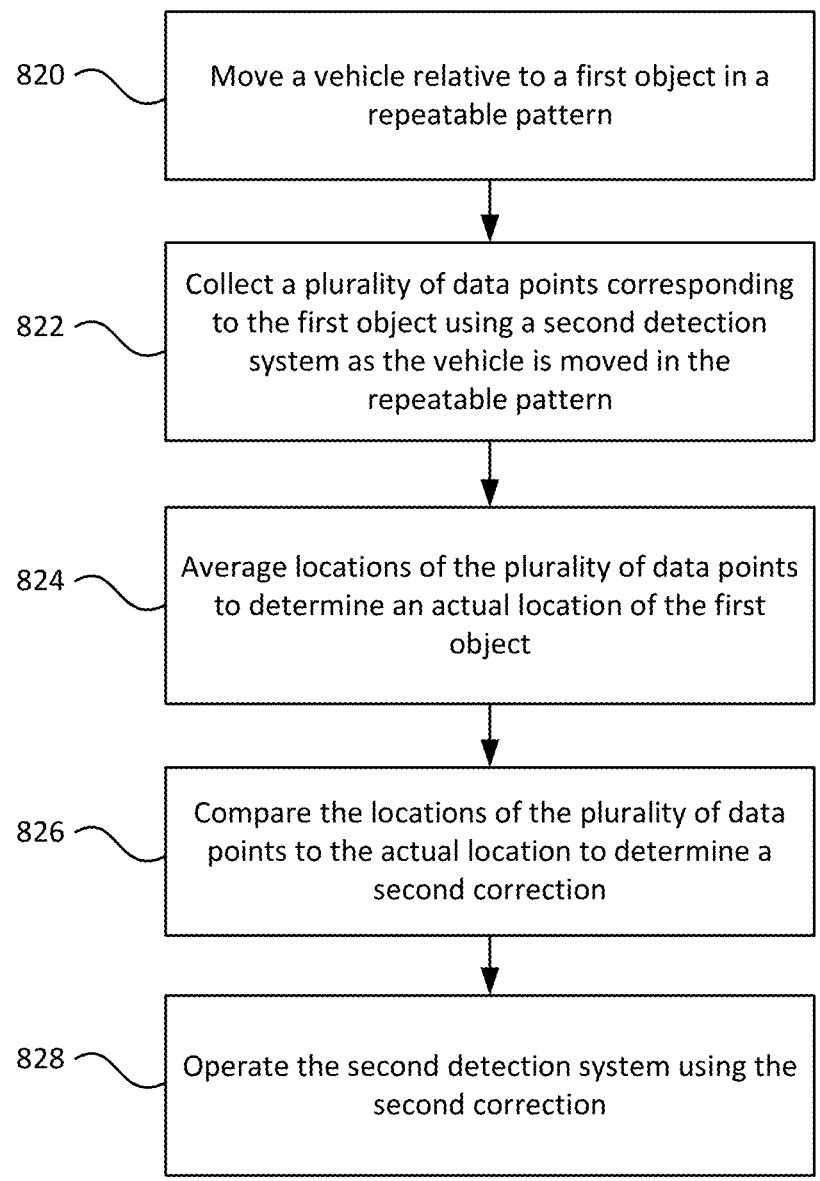
Figure 8C:
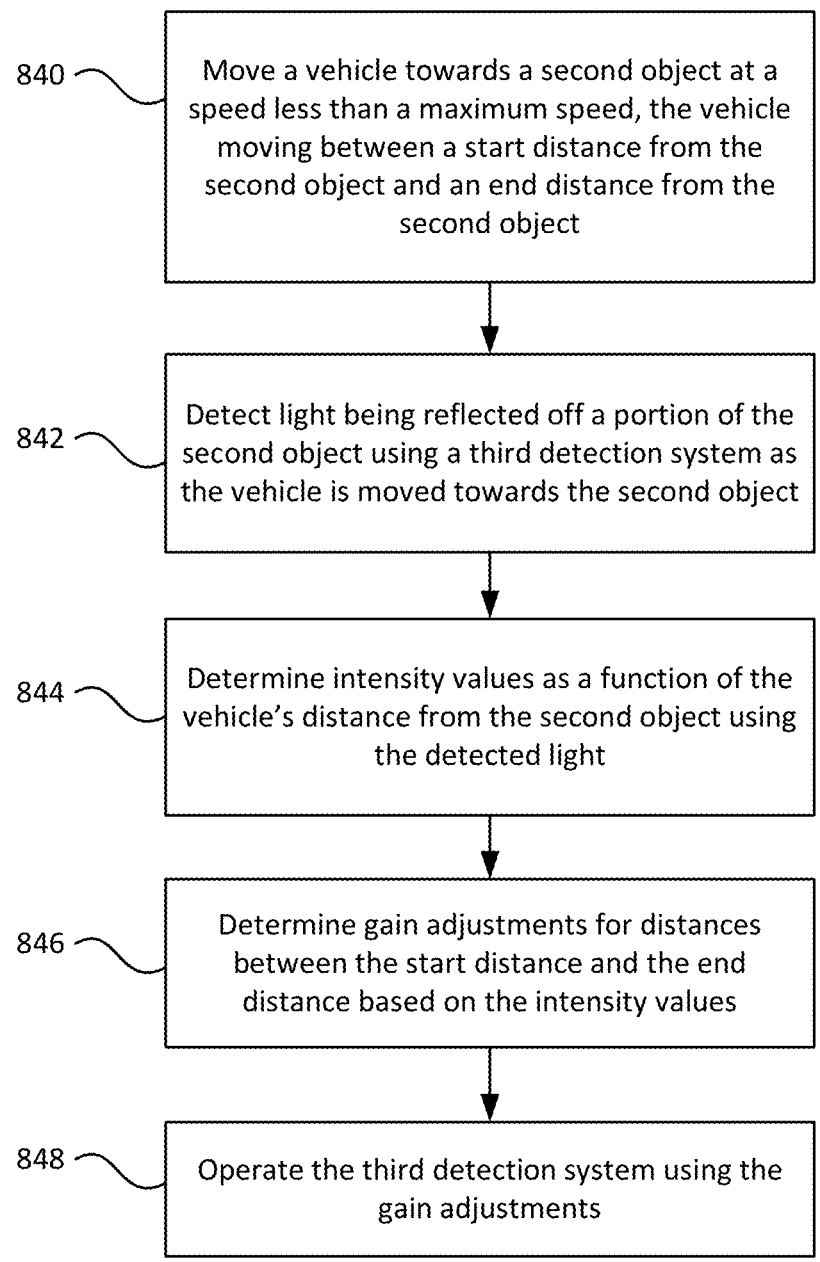
Figure 8D:
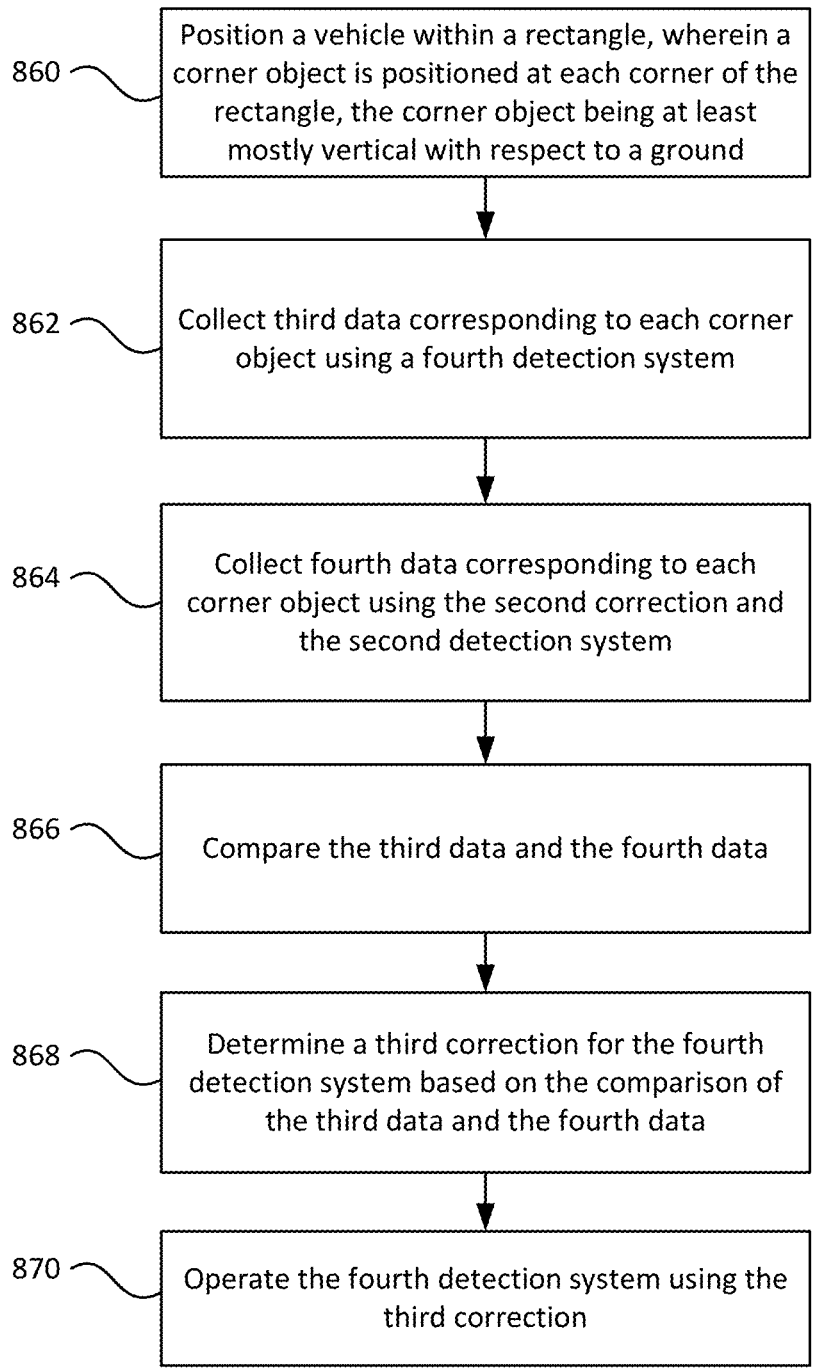
Figure 8E:
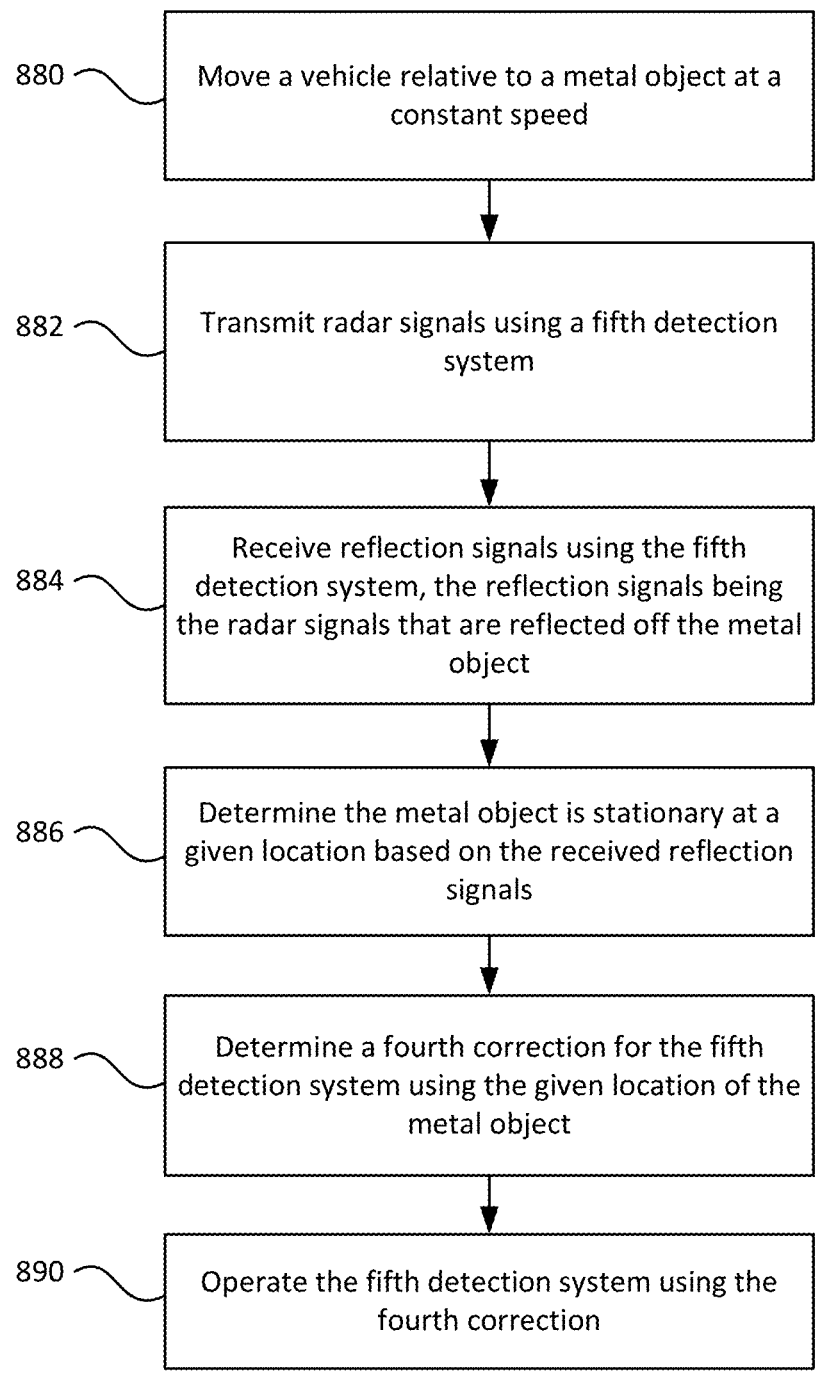

The fifth detection system 188 may be calibrated by moving the vehicle 100 relative to one or more objects at a constant speed. In one example shown in FIG. 7, the vehicle 100 is driven past at least one object 702 in a direction indicated by arrow 704. The at least one object 702 may be an electrically conductive object, a mostly electrically conductive object, or an object of another type of material or combination of materials that is detectible by the fifth detection system 188, such as, but not limited to, a metal object. In another example, at least one object is moved while the vehicle 100 remains stationary. As the vehicle 100 is moved past the at least one object 702, the fifth detection system 188 may transmit radar signals, as indicated by the circles in FIG. 7, using the one or more radar systems and receive reflection signals that reflect off the objects, as illustrated by the arcs in FIG. 7. The vehicle's computing devices 110 may detect the at least one object 702 based on the received reflection signals and determine that the at least one object 702 is stationary and at a given location based on the received reflection signals. The determination that the at least one object 702 is stationary may be made based on Doppler and bearing measurements using any known computational method.

A correction may be determined in order to adjust zero values of the one or more radar systems of the fifth detection system 188. In some examples, the correction may be a 3×3 transform matrix. The correction may be stored in the memory of the vehicle's computing devices 110 and used to operate the fifth detection system 188. In this way, the vehicle's computing devices 110 may detect locations of objects in the vehicle's environment using the calibrated fifth detection system 188 with more accuracy in relation to the vehicle 100. The vehicle 100 may be operated autonomously with the more accurately detected locations of objects.

In cases when there are additional detections systems, each additional detection system, such as a camera, may be calibrated based on its position relative to the calibrated second detection system 182. Some of the additional detection systems may be rigidly connected to any other detection system, such as mounted in the positioning box 200 in relation to another detection system, in which case these additional detection systems may have known positions relative one another, such as relative to the positioning box 200. These known relative positions may be combined with the corrections to the first detection system 180 and the second detection system 182 in order to determine one or more corrections for these additional detection systems.

When the position of an additional detection system relative to the calibrated second detection system 182 is not known, data may be collected using the additional detection system and the calibrated second detection system 182 related to objects in an overlap area of the two detection systems. A correction for the additional detection system may be determined in order to adjust zero values of the additional detection system so that locations of objects in the overlap area detected by the additional detection system matches locations of the objects detected by the calibrated second detection system 182.

The one or more corrections for the additional detection systems may be stored in the memory of the vehicle's computing devices 110 and used to operate the additional detection systems. In this way, the vehicle's computing devices 110 may detect locations of objects in the vehicle's environment using the calibrated additional detection systems with more accuracy in relation to the vehicle 100. The vehicle 100 may be operated autonomously with the more accurately detected locations of objects.

In some implementations, one or more of the detection systems that are rigidly connected with respect to another detection system may be calibrated before being mounted on the vehicle 100. For example, the first detection system 180, the second detection system 182, and the third detection system 184 are fixed relative to one another in the positioning box 200 and therefore may be calibrated while assembled in the positioning box 200, before the positioning box 200 is mounted on the vehicle 100. In addition, intrinsic calibrations of one or more of the detection systems that are not described may be performed prior to mounting on the vehicle 100.

After the plurality of detection systems are calibrated as described above, the vehicle's computing devices 110 may operate the vehicle 100 using the plurality of detection systems and the determined corrections associated with each detection system in the plurality of detection systems. Updated corrections may be determined at a later time and stored in the memory of the vehicle's computing devices 110.

In FIGS. 8A-8E, flow diagrams 800A-800E depict methods of calibration according to some of the aspects described above. While FIGS. 8A-8E show blocks in a particular order, the order may be varied and that multiple operations may be performed simultaneously. Also, operations may be added or omitted.

The flow diagram 800A shows the method of calibrating the first detection system 180. The method may be performed by the vehicle's computing devices 110. At block 802, the vehicle 100 may be positioned in a first position facing a first direction. At block 804, the vehicle's computing devices 110 may collect first data using the first detection system 180 when the vehicle 100 is in the first position. At block 806, the vehicle 100 may be positioned in a second position facing a second direction. The second direction is directly opposite the first direction. At block 808, the vehicle's computing devices 110 may collect second data from the first detection system when the vehicle 100 is in the second position. At block 810, the vehicle's computing devices 110 may determine a first correction for the first detection system by comparing the first data and the second data. At block 812, the vehicle's computing devices 110 may begin to operate the first detection system using the first correction.

The flow diagram 800B shows the method of calibrating the second detection system 182. The method may be performed by the vehicle's computing devices 110. At block 820, the vehicle 100 may be moved relative to a first object in a repeatable pattern. At block 822, the vehicle's computing devices 110 may collect a plurality of data points corresponding to the first object using the second detection system 182 as the vehicle is moved in the repeatable pattern. At block 824, the vehicle's computing devices 110 may average the locations of the plurality of data points to determine an actual location of the first object. At block 826, the locations of the plurality of data points may be compared to the actual location in order to determine a second correction for the second detection system 182. At block 828, the vehicle's computing devices 110 may begin to operate the second detection system 182 using the second correction.

The flow diagram 800C shows the method of calibrating the third detection system 184. The method may be performed by the vehicle's computing devices 110. At block 840, the vehicle 100 may be moved towards a second object at a speed less than a maximum speed. The vehicle 100 may be moved from a start distance from the second object to an end distance from the second object. At block 842, the vehicle's computing devices 110 may detect light being reflected off a portion of the second object using the third detection system 184 as the vehicle 100 is moved towards the second object. At block 844, the vehicle's computing devices 110 may determine intensity values as a function of the vehicle's distance from the second object using the detected light. For example, a first intensity value may be determined for a first distance between the start distance and the end distance, and a second intensity value may be determined for a second distance between the start distance and the end distance, and so on. At block 846, the vehicle's computing devices 110 may determine gain adjustments for distances between the start distance and the end distance based on the intensity values. At block 848, the vehicle's computing devices 110 may operate the third detection system 184 using the gain adjustments.

The flow diagram 800D shows the method of calibrating the fourth detection system 186. The method may be performed by the vehicle's computing devices 110. At block 860, the vehicle 100 may be positioned within a rectangle that has a corner object positioned at each corner. The corner object is vertical or mostly vertical with respect to a ground. At block 862, the vehicle's computing devices 110 may collect third data corresponding to each corner object using the fourth detection system 186. At block 864, the vehicle's computing devices 110 may collect fourth data corresponding to each corner object using the second detection system 182. The second detection system 182 may be operated using the second correction. At block 866, the vehicle's computing devices 110 may compare the third data and the fourth data, and at block 868, the vehicle's computing devices 110 may determine a third correction for the fourth detection system 186 based on the comparison of the third data and the fourth data. At block 870, the vehicle's computing devices 110 may begin to operate the fourth detection system 186 using the third correction.

The flow diagram 800E shows the method of calibrating the fifth detection system 188. The method may be performed by the vehicle's computing devices 110. At block 880, the vehicle may be moved relative to a metal object at a constant speed. At block 882, the vehicle's computing devices 110 may transmit radar signals using the fifth detection system 188, and at block 884, may receive reflection signals using the fifth detection system 188. The reflection signals may be the radar signals that are reflected off the metal object. At block 886, the vehicle's computing devices 110 may determine the metal object is stationary at a given location based on the received reflection signals. At block 888, the vehicle's computing devices 110 may determine a fourth correction for the fifth detection system 188 using the given location of the metal object. At block 890, the vehicle's computing devices 110 may begin to operate the fifth detection system 188 using the fourth correction.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of calibrating a plurality of detection systems of a vehicle, the method comprising:
   moving the vehicle relative to a first object in a repeatable pattern;
   collecting, by one or more computing devices, a plurality of data points using a first detection system of the plurality of detection systems as the vehicle is moved in the repeatable pattern, the plurality of data points corresponding to the first object;
   combining, by the one or more computing devices, locations of the plurality of data points to determine an actual location of the first object;
   determining, by the one or more computing devices, a first correction for the first detection system by comparing the locations of the plurality of data points to the actual location; and
   operating, by the one or more computing devices, the first detection system using the first correction.

2. The method of claim 1, wherein the repeatable pattern is a figure eight.

3. The method of claim 1, wherein combining the locations of the plurality of data points includes averaging the locations of the plurality of data points.

4. The method of claim 1, further comprising:
moving the vehicle towards a second object at a speed less than a maximum speed, the vehicle moving between a start distance from the second object and an end distance from the second object;
detecting, using a second detection system of the plurality of detection systems, light being reflected off a portion of the second object as the vehicle is moved towards the second object;
determining, by the one or more computing devices, intensity values of the detected light for each distance between the start distance and the end distance;
determining, by the one or more computing devices, a second correction for the second detection system based on the intensity values determined for each distance between the start distance and the end distance; and
operating, by the one or more computing devices, the second detection system using the second correction.

5. The method of claim 4, wherein the second correction includes gain adjustments for the distances between the start distance and the end distance.

6. The method of claim 1, further comprising:
positioning the vehicle in a first position facing a first direction;
collecting, by the one or more computing devices, first data from a third detection system of the plurality of detection systems when the vehicle is in the first position;
positioning the vehicle in a second position facing a second direction directly opposite the first direction;
collecting, by the one or more computing devices, second data from the third detection system when the vehicle is in the second position;
determining, by the one or more computing devices, a third correction for the third detection system by comparing the first data and the second data; and
operating, by the one or more computing devices, the third detection system using the third correction.

7. The method of claim 6, wherein the first data and the second data include orientation information of the vehicle.

8. The method of claim 1, further comprising:
positioning the vehicle within a rectangle, wherein a corner object is positioned at each corner of the rectangle, the corner object being at least mostly vertical with respect to a ground;
collecting, by the one or more computing devices, third data using a fourth detection system of the plurality of detection systems, the third data corresponding to each corner object;
collecting, by the one or more computing devices using the first correction, fourth data from the first detection system, the fourth data corresponding to each corner object;
determining, by the one or more computing devices, a fourth correction for the fourth detection system by comparing the third data and the fourth data; and
operating, by the one or more computing devices, the fourth detection system using the fourth correction.

9. The method of claim 1, further comprising:
moving the vehicle relative to a metal object at a constant speed;
transmitting, by the one or more computing devices, radar signals using a fifth detection system of the plurality of detection systems;
receiving, by the one or more computing devices, reflection signals using the fifth detection system, the reflection signals being the radar signals that are reflected off the metal object;
determining, by the one or more computing devices, the metal object is stationary at a given location based on the received reflection signals;
determining, by the one or more computing devices, a fifth correction for the fifth detection system using the given location of the metal object; and
operating, by the one or more computing devices, the fifth detection system using the fifth correction.

10. The method of claim 1, further comprising operating the vehicle autonomously based on data collected using the plurality of detection systems.

11. A system comprising:
a plurality of detection systems of a vehicle, the plurality of detection systems including a first detection system configured to collect data points of the vehicle's environment; and
one or more computing devices configured to:
collect a plurality of data points using the first detection system as the vehicle is moved in a repeatable pattern, the plurality of data points corresponding to a first object in the vehicle's environment;
combine locations of the plurality of data points to determine an actual location of the first object;
determine a first correction for the first detection system by comparing the locations of the plurality of data points to the actual location; and
operate the first detection system using the first correction.

12. The system of claim 11, wherein the plurality of detection systems further includes a second detection system configured to transmit and detect light being reflected off a given object in the vehicle's environment; and
wherein the one or more computing devices are further configured to:
detect, using the second detection system, light being reflected off a portion of a second object as the vehicle is moved towards the second object between a start distance and an end distance;
determine intensity values of the detected light for each distance between the start distance and the end distance;
determine a second correction for the second detection system based on the intensity values determined for each distance between the start distance and the end distance; and
operate the second detection system using the second correction.

13. The system of claim 11, wherein the plurality of detection systems further includes a third detection system configured to collect orientation information of the vehicle; and
wherein the one or more computing devices are further configured to:
collect first data from the third detection system when the vehicle is in a first position facing a first direction;
collect second data from the third detection system when the vehicle is in a second position facing a second direction, the second direction being directly opposite the first direction;
determine a third correction for the third detection system by comparing the first data and the second data; and operate the third detection system using the third correction.

14. The system of claim 11, wherein the plurality of detection systems further includes a fourth detection system; and
wherein the one or more computing devices are further configured to:
collect third data using the fourth detection system, the third data corresponding to one or more corner objects when the vehicle is positioned within a rectangle, the one or more corner objects being positioned at each corner of the rectangle and being at least mostly vertical with respect to a ground;
collect fourth data using the first detection system and the first correction, the fourth data corresponding to each corner object;
determine a fourth correction for the fourth detection system by comparing the third data and the fourth data; and
operate the fourth detection system using the fourth correction.

15. The system of claim 11, wherein the plurality of detection systems further includes a fifth detection system configured to transmit radar signals; and
wherein the one or more computing devices are further configured to:
receive reflection signals using the fifth detection system, the reflection signals being the radar signals that are reflected off a metal object when the vehicle is moved relative to the metal object at a constant speed;
determine the metal object is stationary at a given location based on the received reflection signals;
determine a fifth correction for the fifth detection system using the given location of the metal object; and
operate the fifth detection system using the fifth correction.

16. The system of claim 11, further comprising the vehicle.

17. A non-transitory, tangible computer-readable storage medium on which computer readable instructions of a program are stored, the instructions, when executed by one or more computing devices, cause the one or more computing devices to perform a method, the method comprising:
collecting a plurality of data points using a first detection system of a vehicle as the vehicle is moved in a repeatable pattern, the plurality of data points corresponding to a first object in the vehicle's environment;
averaging locations of the plurality of data points to determine an actual location of the first object;
determining a first correction for the first detection system by comparing the locations of the plurality of data points to the actual location; and
operating the first detection system using the first correction.

18. The medium of claim 17, wherein the method further comprises:
detecting, using a second detection system of the vehicle, light being reflected off a portion of a second object as the vehicle is moved towards the second object between a start distance and an end distance;
determining intensity values of the detected light for each distance between the start distance and the end distance;
determining a second correction for the second detection system based on the intensity values determined for each distance between the start distance and the end distance; and
operating the second detection system using the second correction.

19. The medium of claim 17, wherein method further comprises: collecting first orientation data using a third detection system of the vehicle when the vehicle is in a first position facing a first direction;
collecting second orientation data using the third detection system when the vehicle is in a second position facing a second direction, the second direction being directly opposite the first direction;
determining a third correction for the third detection system by comparing the first orientation data and the second orientation data; and
operating the third detection system using the third correction.

20. The medium of claim 17, wherein the method further comprises:
collecting third data using a fourth detection system of the vehicle, the third data corresponding to one or more corner objects when the vehicle is positioned within a rectangle, the one or more corner objects being positioned at each corner of the rectangle and being at least mostly vertical with respect to a ground;
collecting fourth data using the first detection system and the first correction, the fourth data corresponding to each corner object;
determining a fourth correction for the fourth detection system by comparing the third data and the fourth data; and
operating the fourth detection system using the fourth correction.

* * * * *